United States Patent
Wang et al.

(10) Patent No.: US 9,843,775 B2
(45) Date of Patent: Dec. 12, 2017

(54) SURVEILLANCE VIDEO PLAYBACK METHOD, DEVICE, AND SYSTEM

(71) Applicant: Huawei Technologies Co., Ltd., Shenzhen (CN)

(72) Inventors: Feng Wang, Nanjing (CN); Liyan Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/880,515

(22) Filed: Oct. 12, 2015

(65) Prior Publication Data

US 2016/0094805 A1 Mar. 31, 2016

Related U.S. Application Data

(63) Continuation of application No. PCT/CN2014/075576, filed on Apr. 17, 2014.

(30) Foreign Application Priority Data

Apr. 17, 2013 (CN) .......................... 2013 1 0134227

(51) Int. Cl.
*H04N 21/2365* (2011.01)
*H04N 7/173* (2011.01)
(Continued)

(52) U.S. Cl.
CPC ......... *H04N 7/17318* (2013.01); *H04N 7/181* (2013.01); *H04N 9/87* (2013.01);
(Continued)

(58) Field of Classification Search
None
See application file for complete search history.

(56) References Cited

U.S. PATENT DOCUMENTS

2004/0231001 A1* 11/2004 Kisliakov .......... H04N 7/17318 725/134
2008/0252722 A1  10/2008 Wang et al.
(Continued)

FOREIGN PATENT DOCUMENTS

CN        1786422 A    6/2006
CN      101035268 A    9/2007
(Continued)

OTHER PUBLICATIONS

Partial English Translation and Abstract of Chinese Patent Application No. CN201322840, Dec. 10, 2015, 4 pages.
(Continued)

*Primary Examiner* — Omar S Parra
(74) *Attorney, Agent, or Firm* — Conley Rose, P.C.

(57) ABSTRACT

The surveillance video playback method includes receiving, by a video surveillance management device, a surveillance video browsing request from a client device, and performing, according to the request, authentication on a user that sends the surveillance video browsing request using the client device; if the user that sends the surveillance video browsing request has permission to view collected data, sending a first link address corresponding to the user request to the client device; and sending video data and the collected data to the client device according to a data request that carries the first link address and is returned by the client device, so that the client device can superimpose the collected data on the video data and then play them.

23 Claims, 9 Drawing Sheets

(51) Int. Cl.
*H04N 7/18* (2006.01)
*H04N 9/87* (2006.01)
*H04N 21/2387* (2011.01)
*H04N 21/4223* (2011.01)
*H04N 21/472* (2011.01)
*H04N 21/6334* (2011.01)
*H04N 21/6437* (2011.01)
*H04N 21/81* (2011.01)
*H04N 21/845* (2011.01)
*H04N 21/858* (2011.01)

(52) U.S. Cl.
CPC ..... *H04N 21/2365* (2013.01); *H04N 21/2387* (2013.01); *H04N 21/4223* (2013.01); *H04N 21/47202* (2013.01); *H04N 21/47217* (2013.01); *H04N 21/6334* (2013.01); *H04N 21/6437* (2013.01); *H04N 21/8133* (2013.01); *H04N 21/8455* (2013.01); *H04N 21/8586* (2013.01)

(56) References Cited

U.S. PATENT DOCUMENTS

| | | | |
|---|---|---|---|
| 2009/0074184 | A1 | 3/2009 | Baum et al. |
| 2013/0286211 | A1* | 10/2013 | Cao ........................ H04N 7/181 348/159 |
| 2017/0104962 | A1* | 4/2017 | Leblond ................ H04N 7/181 |

FOREIGN PATENT DOCUMENTS

| | | |
|---|---|---|
| CN | 101282450 A | 10/2008 |
| CN | 101287003 A | 10/2008 |
| CN | 201134889 Y | 10/2008 |
| CN | 201197180 Y | 2/2009 |
| CN | 101448072 A | 6/2009 |
| CN | 102006456 A | 4/2011 |
| CN | 102036058 A | 4/2011 |
| CN | 102045540 A | 5/2011 |
| CN | 201892999 U | 7/2011 |
| CN | 102196248 A | 9/2011 |
| CN | 202168161 U | 3/2012 |
| CN | 102594884 A | 7/2012 |
| WO | 2004036926 A2 | 4/2004 |

OTHER PUBLICATIONS

Partial English Translation and Abstract of Chinese Patent Application No. CN101282450, Sep. 16, 2015, 6 pages.
Partial English Translation and Abstract of Chinese Patent Application No. CN201197180, Sep. 16, 2015, 10 pages.
Foreign Communication From a Counterpart Application, PCT Application No. PCT/CN2014/075576, English Translation of International Search Report dated Jul. 3, 2014, 2 pages.
Foreign Communication From a Counterpart Application, PCT Application No. PCT/CN2014/075576, English Translation of Written Opinion dated Jul. 3, 2014, 11 pages.
Partial English Translation and Abstract of Chinese Patent Application No. CN1786422, Dec. 8, 2016, 12 page.
Partial English Translation and Abstract of Chinese Patent Application No. CN101035268, Dec. 8, 2016, 8 page.
Foreign Communication From a Counterpart Application, Chinese Application No. 201310134227.0, Chinese Office Action dated Nov. 7, 2016, 9 pages.
Foreign Communication From a Counterpart Application, European Application No. 14785139.8, Extended European Search Report dated Mar. 2, 2016, 7 pages.

* cited by examiner

SURVEILLANCE VIDEO PLAYBACK METHOD, DEVICE, AND SYSTEM

CROSS-REFERENCE TO RELATED APPLICATIONS

This application is a continuation of International Application No. PCT/CN2014/075576, filed on Apr. 17, 2014, which claims priority to Chinese Patent Application No. 201310134227.0, filed on Apr. 17, 2013, both of which are hereby incorporated by reference in their entireties.

TECHNICAL FIELD

The present invention relates to a surveillance video playback method, a device, and a system.

BACKGROUND

A network video surveillance service is a broadband-based value-added service for surveilling, transmitting, storing, and managing remote images. The network video surveillance service uses a broadband network to connect scattered and independent image collection points to implement cross-region and unified surveillance, storage, management, and resource sharing within all coverage.

To further assist in surveillance decision making, a data collector may be connected to a peripheral unit to collect data of an environment near a surveillance site. The data collector may be a temperature and humidity collector, a wind direction and wind speed collector, a noise collector, or the like. The collected data may be used for a subsequent query and analysis or may be directly called during surveillance.

When a user calls a surveillance video, some surveillance devices directly superimpose data collected by the peripheral unit on video data (that is, video streams) during coding at a source and play the superimposed data for a surveillance person. In this manner of superimposing data at the source, everybody has to see the data. However, not everybody needs to see the collected data. This manner of playing the surveillance video is not flexible.

SUMMARY

The present invention provides a surveillance video playback method, a device, and a system, so as to prevent a problem that everybody has to see collected data associated with surveillance video data, and to provide a more flexible method for playing superimposed surveillance video data and collected data, thereby bringing better experience for users.

In view of this, embodiments of the present application provide a surveillance video playback method, a device, and a system, such that collected data is superimposed on video data and played only when a user has permission to view the collected data, making surveillance video playback more flexible, and preventing a problem that everybody has to see the collected data.

According to a first aspect, a surveillance video playback method is provided, including receiving, by a video surveillance management device, a surveillance video browsing request from a client device, and performing, according to the request, authentication on a user that sends the surveillance video browsing request using the client device; if the user that sends the surveillance video browsing request has permission to view collected data, sending a first link address to the client device, where the first link address is a Real-Time Streaming Protocol (RTSP) video playback link address that carries markup of video data and the collected data; and sending the video data and the collected data to the client device according to a data request that carries the first link address and is returned by the client device, such that the client device can superimpose the collected data on the video data and then play them.

With reference to the first aspect, in a first possible implementation manner of the first aspect, before the step of sending the video data and the collected data to the client device according to the first link address, the method further includes receiving, by the video surveillance management device, the video data and the collected data that are transmitted by a peripheral unit.

With reference to the first possible implementation manner of the first aspect, in a second possible implementation manner of the first aspect, the step of receiving, by the video surveillance management device, the video data and the collected data that are transmitted by a peripheral unit includes receiving, by the video surveillance management device, the video data that is transmitted by the peripheral unit using the RTSP/Real-Time Transport Protocol (RTP), where the collected data is carried in an RTP header of the video data.

With reference to the first possible implementation manner of the first aspect, in a third possible implementation manner of the first aspect, after the step of receiving, by the video surveillance management device, the video data and the collected data that are transmitted by a peripheral unit, the method further includes, if the peripheral unit is recording a video, separately storing the video data and the collected data in different files, and generating a video data index and adding an index pointer for the collected data at the same time according to a time association between the collected data and the video data; or extending the collected data in an extension field of the video data to store the collected data together with the video data.

With reference to the first aspect, in a fourth possible implementation manner of the first aspect, the step of sending the video data and the collected data to the client device according to the first link address includes, according to the first link address, separately transmitting the video data and the collected data to the client device; or combining the video data and the collected data and then sending them together to the client device.

With reference to the first aspect, in a fifth possible implementation manner of the first aspect, after the step of receiving, by a video surveillance management device, a surveillance video browsing request from a client device, and performing, according to the request, authentication on a user that sends the surveillance video browsing request using the client device, the method further includes sending a second link address to the client device if the user that sends the surveillance video browsing request does not have the permission to view the collected data, where the second link address is an RTSP video playback link address that carries only video data; and sending the video data to the client device according to a data request that carries the second link address and is returned by the client device.

According to a second aspect, a client device is provided, including a request module, a receiving module, a data acquiring module, and a playback module, where the request module is configured to send a surveillance video browsing request to a video surveillance management device; the receiving module is configured to, when the video surveillance management device determines, according to the surveillance video browsing request, that a user that sends the surveillance video browsing request using the client device has permission to view collected data, receive a first link address returned by the video surveillance management device, where the first link address is an RTSP video playback link address that carries markup of video data and the collected data, and output the first link address to the data acquiring module; the data acquiring module is configured to acquire the video data and the collected data from the video surveillance management device according to the first link address, and output the video data and the collected data to the playback module; and the playback module is configured to superimpose the collected data on the video data and then play them.

With reference to the second aspect, in a first possible implementation manner of the second aspect, the client device further includes a determining module configured to determine whether an instruction to select data superimposition is received, and output a result of the determining to the playback module; and the playback module is configured to, when the determining module determines that the instruction to select data superimposition is received, superimpose the collected data on the video data and then play them; or when the determining module determines that the instruction to select data superimposition is not received, play the video data.

With reference to the second aspect, in a second possible implementation manner of the second aspect, the receiving module is configured to, when the video surveillance management device determines, according to the surveillance video browsing request, that the user that sends the surveillance video browsing request using the client device does not have the permission to view the collected data, receive a second link address returned by the video surveillance management device, where the second link address is an RTSP video playback link address that carries only video data, and output the second link address to the data acquiring module; the data acquiring module is configured to acquire the video data from the video surveillance management device according to the second link address, and output the video data to the playback module; and the playback module is configured to play the video data.

According to a third aspect, a video surveillance management device is provided, including an authenticating module and a sending module, where the authenticating module is configured to receive a surveillance video browsing request from a client device, perform, according to the request, authentication on a user that sends the surveillance video browsing request using the client device, and output a result of the authentication to the sending module; and the sending module is configured to, when the authenticating module learns, by means of the authentication, that the user that sends the surveillance video browsing request has permission to view collected data, send a first link address to the client device, where the first link address is an RTSP video playback link address that carries markup of video data and the collected data, and send the video data and the collected data to the client device according to a data request that carries the first link address and is returned by the client device, such that the client device can superimpose the collected data on the video data and then play them.

With reference to the third aspect, in a first possible implementation manner of the third aspect, the device further includes a data acquiring module configured to receive the video data and the collected data that are transmitted by a peripheral unit.

With reference to the first possible implementation manner of the third aspect, in a second possible implementation manner of the third aspect, the device further includes a storage module configured to, when the peripheral unit is recording a video, separately store, in different files, the video data and the collected data that are received by the data acquiring module, and generate a video data index and add an index pointer for the collected data at the same time according to a time association between the collected data and the video data; or extend the collected data received by the data acquiring module in an extension field of the video data to store the collected data together with the video data.

According to a fourth aspect, a video surveillance system is provided, including the client device according to the second aspect and any one of the possible implementation manners of the second aspect and the video surveillance management device according to the third aspect and any one of the possible implementation manners of the third aspect.

Beneficial effects of the present invention are: Different from the implementation in the prior art, in the present application, permission of a client device is managed, and collected data and video data are superimposed and then played only when a user that sends a surveillance video browsing request has permission to view the collected data. In this manner, whether to play collected data with video data can be flexibly controlled according to permission of a user that sends a surveillance video browsing request, thereby making surveillance video playback more flexible, preventing a problem that a person that does not need to view the collected data has to view the collected data, and bringing better experience effects.

DESCRIPTION OF EMBODIMENTS

Figure 1:
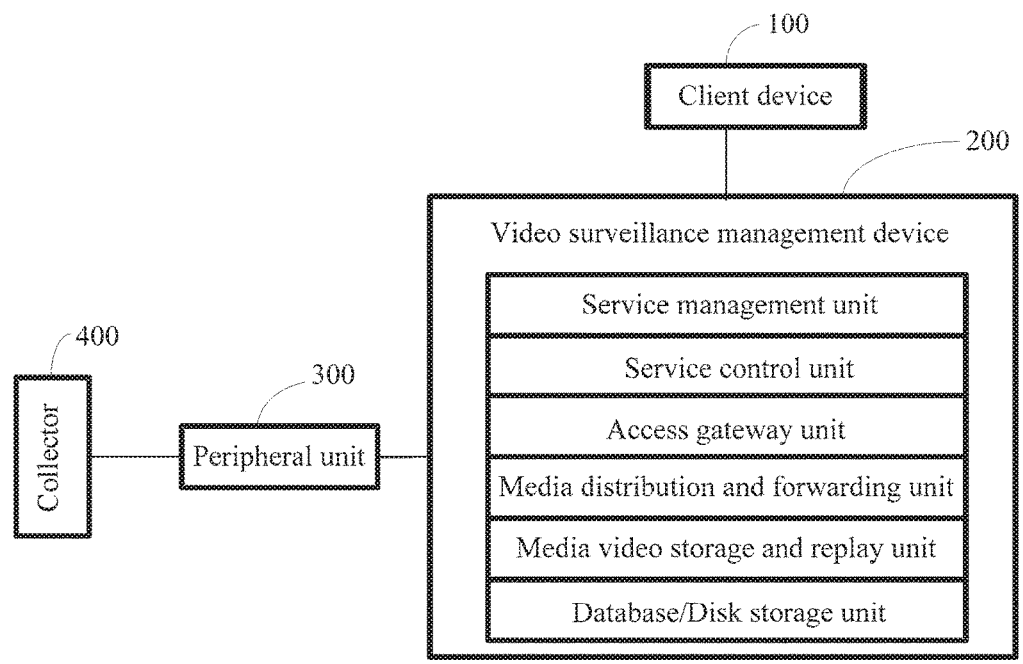
FIG. 1 is a schematic structural diagram of an embodiment of a video surveillance system according to the present application.

Referring to FIG. 1, FIG. 1 is a schematic structural diagram of an embodiment of a video surveillance system according to the present application. In this embodiment, the video surveillance system includes a client device 100, a video surveillance management device 200, a peripheral unit 300, and a collector 400. The client device 100 is a specific entity device or a virtual device that bears client functions, and mainly implements functions of viewing a surveillance video and collected data for a surveillance person. The video surveillance management device 200 implements communication with the client device 100 and the peripheral unit 300 through a network, and mainly implements functions such as managing surveillance video data and collected data and managing permission of a user of the client device. According to different application scenarios, the client device 100 and the video surveillance management device 200 may be entity devices that are independently disposed in the video surveillance system, or may be integrated as a functional module into an existing video surveillance device, for example, being integrated into a user terminal device to implement functions of both the client device 100 and the video surveillance management device 200 on the user terminal device.

For example, the client device 100 may implement the client functions in a form of software and be installed inside a user terminal device, and may implement the client functions using a mobile phone terminal, a personal digital assistant (PDA), a tablet computer (e.g. iPAD), a personal computer (PC), a surveillance center device, and the like. The client device 100 may further include functional modules such as a video decoder, a large-size screen, a surveillance keyboard, and a server to complete a surveillance task of a user together. In this embodiment of the present application, to achieve better output of video surveillance, an intelligent video analysis unit needs to be further disposed, when required, to complete tasks of performing intelligent analysis on a video and outputting a result. A physical form of the intelligent video analysis unit may be a server or a professional device, or the intelligent video analysis unit may belong to a same server as the video surveillance management device 200, or may be integrated into the peripheral unit 300, or may be included, in a form of software, in software of the client device 100 and be installed on the user terminal device. The client device 100 provides a user with general functions such as video surveillance, video query and playback, pan-tilt-zoom and lens control, and alarm notification and linkage.

According to one function division manner, the video surveillance management device 200 may include the following logical units: a service management unit, a service control unit, an access gateway unit, a media distribution and forwarding unit, a media video storage and playback or replay unit, and a database/disk storage unit.

The service management unit is configured to manage the video surveillance management device and a user and manage permission of the user. The service control unit is configured to process running control of the peripheral unit 300 over services including requesting a video from the peripheral unit 300, controlling a pan-tilt-zoom (PTZ) and lens of the peripheral unit 300, processing an alarm of the peripheral unit 300, implementing a video recording plan of the peripheral unit 300, and so on, and services such as processing login and deregistration of a user, receiving and processing a user request from the client device 100, and notifying a user side of alarm linkage. The access gateway unit is configured to implement functions such as processing registration of the peripheral unit 300 and the client device 100 to keep them online. The media distribution and forwarding unit is configured to implement a service function of distributing or forwarding a video on the peripheral unit 300 or in a memory to a corresponding destination. The media video storage and playback or replay unit implements a function of storing a video in a disk, or sending the video in the disk to the client device 100 using the media distribution and forwarding unit. The database/disk storage unit is a module for storing data, and may be a built-in disk of a server or may be an external storage disk array device.

The unit division herein is merely an example of logical function division, and there may be multiple other division manners during actual implementation, for example, multiple units may be integrated into one functional module and reside in one or more universal or dedicated servers to implement respective functions, or some features may be ignored or may not be executed.

The peripheral unit 300 is a video collection device, for example, it may be a network video camera, or a simulated camera and a video encoder. The peripheral unit 300 completes a task of collecting video data, transmits the video data to the video surveillance management device 200 through a network, and responds to a control command sent by the video surveillance management device 200. For example, the peripheral unit 300 provides the video surveillance management device 200 with real-time video data and video data of a video on the peripheral unit 300, a PTZ and lens control capability, a capability of configuring parameters of the peripheral unit 300, an alarm capability of the peripheral unit 300, and so on.

The collector 400 is a device configured to collect information about an environment around the peripheral unit 300. In this embodiment of the present application, the collector 400 may be one independent device connected to the peripheral unit 300 using an RS232 or RS485 interface, and may be various collection devices, for example but not limited to, a temperature and humidity collector, a wind direction and wind speed collector, and a noise collector. The collector 400 completes collection of data of an environment near a surveillance site, so as to assist in surveillance decision making. On the other hand, in this embodiment of the present application, the collector 400 may also be integrated into the peripheral unit 300 to provide a collection capability as an internal module. For example, some camera devices have built-in collection functions to complete collection of temperatures of cameras.

Figure 2:
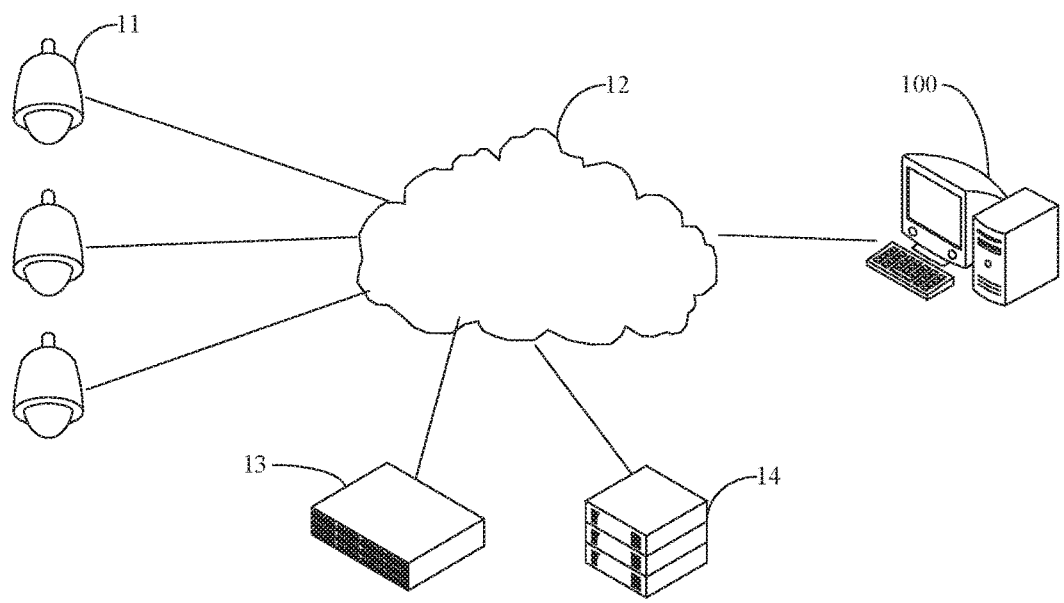
FIG. 2 is a schematic diagram of application of a video surveillance system according to the present application.
Figure 3:
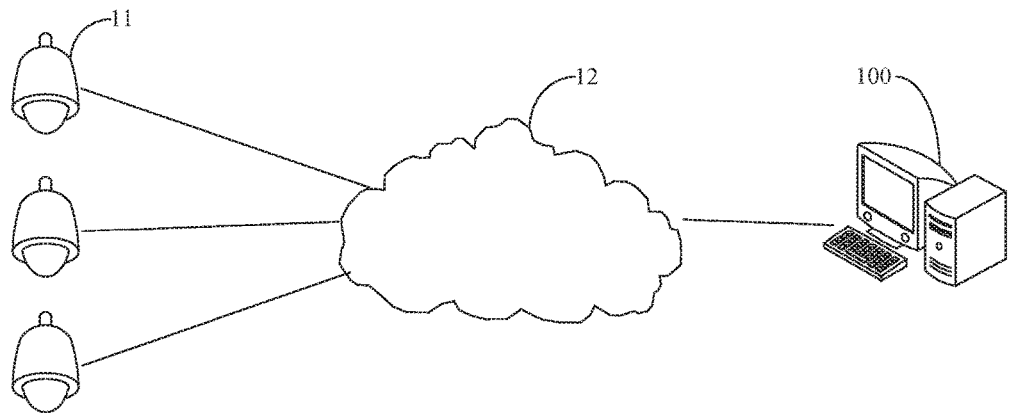
FIG. 3 is another schematic diagram of application of a video surveillance system according to the present application.

Referring to FIG. 2 and FIG. 3, FIG. 2 and FIG. 3 are schematic diagrams of application of a video surveillance system according to the present application, where a camera 11 is a specific implementation form of the foregoing peripheral unit, and the camera 11 may be all types of camera devices including but not limited to PTZ cameras, box cameras, dome cameras, network cameras, and simulated cameras. If the camera 11 is a simulated camera, it needs to be connected to a video encoder, which is not shown in the figure but is also included in the system. The camera 11 may be connected to various collectors such as a temperature and humidity collector, a wind direction and wind speed collector, and a noise collector (which are not drawn in the figure) using an RS232 or RS485 interface. In addition, the camera 11 may also be a camera device that has a built-in collection function.

A network 12 in the figure is configured to implement transmission of a surveillance video and collected data and the like. The network 12 may be all existing networks, and may be the Internet, a local area network, a wide area network, a storage local area network, or the like, or a proper combination thereof. A network access manner may also be various existing access manners, for example, wired (using a network cable or a fiber) and wireless. The wireless manner includes WI-FI (for example, Institute of Electrical and Electronics Engineers (IEEE) 802.11a, IEEE 802.11b, IEEE 802.11g and/or IEEE 802.11n), Global System for Mobile Communications (GSM) Enhanced Data rates for GSM Evolution (EDGE), Wideband Code Division Multiple Access (WCDMA), Code Division Multiple Access (CDMA), Time Division Synchronous Code Division Multiple Access (TD-SCDMA), Bluetooth®, Long-Term Evolution (LTE), or any other proper access manner.

A video surveillance server 13 is configured to implement all functions of the video surveillance management device in the embodiment shown in FIG. 1, and may be all possible servers and/or dedicated servers on the current market.

A storage device 14 may be a built-in disk of a server or an external storage disk array device. A disk array may use a storage manner such as Network Attached Storage (NAS) or Storage Area Network (SAN).

A client device 100 may be all terminal devices that can implement client functions, for example, may include a mobile phone terminal, a PDA, a PAD, a user PC, a video surveillance center device, and the like.

The video surveillance server 13 and the storage device 14 may be all or partially combined and be designed to reside in the client device 100. As shown in FIG. 3, the video surveillance server 13 and the storage device 14 are all integrated into the client device 100, to form a set of recommended video surveillance system, in which a hardware device of the client device 100 is used to bear all functional modules that implement video surveillance in a form of software.

The foregoing embodiment of the video surveillance system is merely a specific example for describing the video surveillance system in the present application. Video surveillance systems that implement same functions in other manners shall also fall within the protection scope of the present application, and are not illustrated one by one herein.

Figure 4:
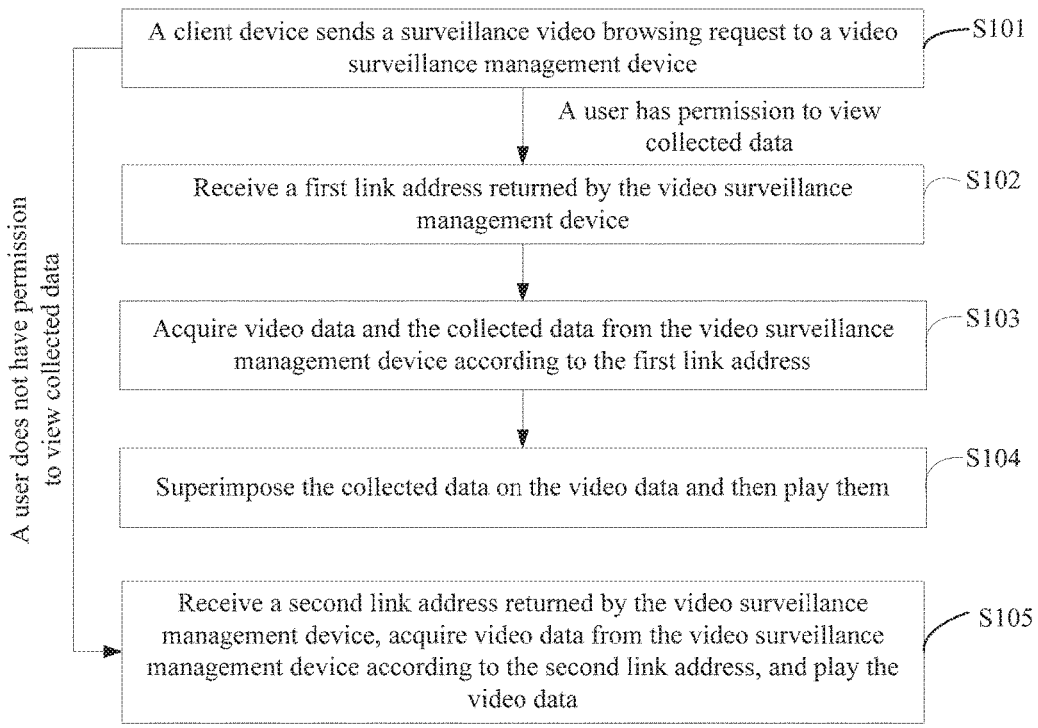
FIG. 4 is a flowchart of an embodiment of a surveillance video playback method according to the present application.

Referring to FIG. 4, FIG. 4 is a flowchart of an embodiment of a surveillance video playback method according to the present application. This embodiment is described from a perspective of the foregoing client device, and the surveillance video playback method includes the following steps.

Step S101: The client device sends a surveillance video browsing request to a video surveillance management device.

When a user needs to view a surveillance video, a surveillance video browsing request is sent to the video surveillance management device, where the request may include condition information of the to-be-viewed video, and may also include user information such as a user account and a user identifier. The user may send a request for browsing a real-time surveillance video or may send a request for browsing a historical surveillance video.

After receiving the surveillance video browsing request, the video surveillance management device performs authentication on the user that sends the request, and determines whether the user that sends the request has permission to view collected data corresponding to requested video data. The video surveillance management device may perform authentication on the user using a preset user permission policy or in another manner, which is not limited in the present application.

When determining that the user that sends the request has the permission to view the collected data, the video surveillance management device performs operations according to a request condition of the user: if the user request is a request for browsing a historical surveillance video, finding a video index file that meets the condition; actually finding related video data and collected data according to a pointer address in the index file; generating a first link address corresponding to the video data requested by the user and to the associated collected data, where the first link address is an RTSP video playback link address that carries markup of the video data and the collected data, the first link address may be an RTSP uniform resource locator (URL); and returning the first link address to the client device. The client device performs step S102 and subsequent steps.

If the user request is a request for browsing a real-time surveillance video, the video surveillance management device generates a first link address according to a specific requested peripheral unit, where the first link address also carries markup of the video data and the collected data, and sends the first link address to the client device.

When determining that the user that sends the request does not have the permission to view the collected data, the video surveillance management device returns a second link address to the client device, where the second link address is an RTSP video playback link address that carries only video data, and the client device performs step S105.

Step S102: Receive a first link address returned by the video surveillance management device.

When the user that sends the surveillance video browsing request has the permission to view the collected data, the authentication at a video surveillance management device end is successful, and the first link address returned by the video surveillance management device is received.

Step S103: Acquire video data and collected data from the video surveillance management device according to the first link address.

If the user requests browsing of a historical surveillance video, the user sends, according to the first link address returned by the video surveillance management device, a request for acquiring the video data and the collected data to the video surveillance management device. The video surveillance management device finds, according to the first link address, a video index file that meets a condition, actually finds the related video data and collected data according to a pointer address in the index file, and sends the video data and the collected data to the client device. The client device 100 receives the video data and the collected data.

If the user requests browsing of a real-time surveillance video, when the client device 100 requests data using the first link address, the video surveillance management device acquires real-time video data and collected data from a corresponding peripheral unit according to information in the first link address, and sends the real-time video data and collected data to the client device 100.

Figure 5:
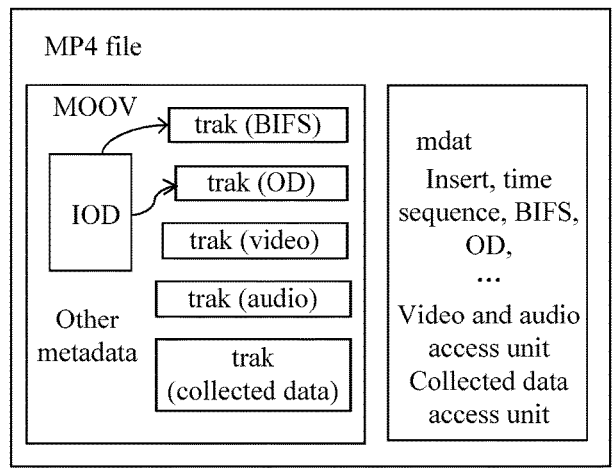
FIG. 5 is a schematic diagram of encapsulation of an MP4 file of collected data in one embodiment of a surveillance video playback method according to the present application.

In an optional manner, the client device 100 may download the acquired video data and collected data and store the data in a file format on a local machine. Storing the downloaded data in a file format may be storing the collected data and the video data together in a same file, or may be storing the collected data, for example, in a subtitle file, separately from a video data file. The manner of storing the video data and the collected data together may be extending the collected data in an extension field of a video data file format such as Moving Picture Experts Group (MPEG)-4 (MP4) and Audio Video Interleave (AVI), and establishing an association with the video data by timestamp (as shown in FIG. 5). The manner of separately storing the video data and the collected data may be storing the collected data independently in binary or text format, and associating the collected data with the video data file using a same file name.

Step S104: Superimpose the collected data on the video data and then play them.

After receiving and temporarily storing the video data and the collected data, the client device 100 decodes the video data, parses the collected data, superimposes the collected data on the video data and performs rendering, and plays the video data and the collected data in a manner of superimposing transparent subtitles on video pictures in an On-Screen Display (OSD).

In a more preferable manner, the client device 100 may determine, according to whether the user selects data superimposition, whether to perform OSD superimposition playback.

In an implementation manner of superimposition playback, the client device 100 receives the video data and the collected data that are transmitted by means of data streams, temporarily stores the data streams of the video data, and temporarily stores data streams of the collected data in a metadata form. When superimposition playback is required, during decoding and playback of the video data, an associated start frame of the temporarily stored video data or video data in a video file is found correspondingly according to timestamp information included in the collected data. During decoding and playback of a video, specific information about the collected data that is included in the collected data corresponding to frames is extracted to generate corresponding characters, and a video including the information about the collected data on a peripheral unit may be played after rendering and superimposition are performed.

In a preferable manner, maximum retention time for collected data may be preset. If no new collected data is received after the maximum retention time for collected data, previously displayed collected data is invalidated (that is, the collected data is no longer superimposed on video pictures). If new collected data is received within the preset maximum retention time, original collected data is replaced with the new collected data, and the new collected data is superimposed on current video data and then played.

Step S105: Receive a second link address returned by the video surveillance management device, acquire video data from the video surveillance management device according to the second link address, and play the video data.

When the user that sends the surveillance video browsing request does not have the permission to view the collected data, the video surveillance management device returns the second link address, where the second link address is an RTSP video playback link address that carries only video data, and the second link address may be an RTSP URL. The video data is acquired from the video surveillance management device according to the second link address and is played.

Figure 6:
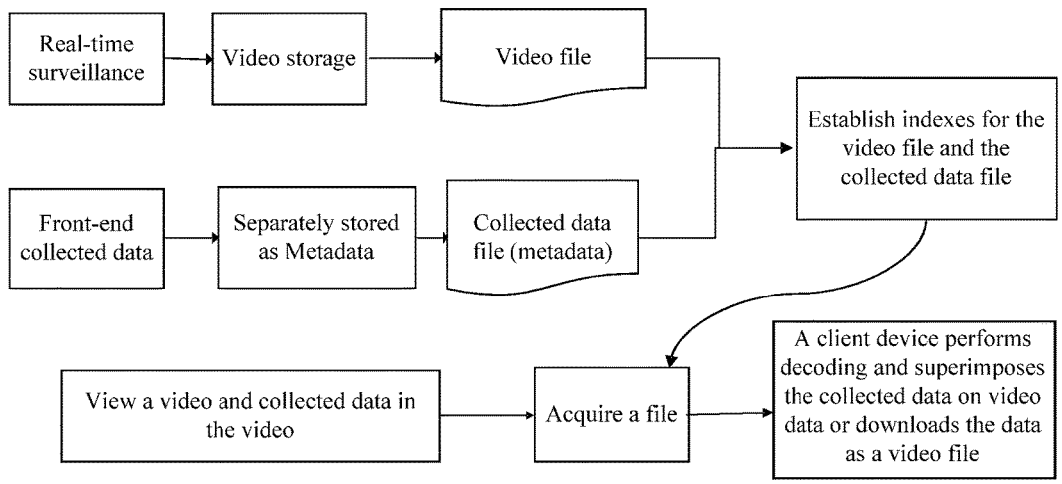
FIG. 6 is a schematic diagram of acquisition of collected data in one embodiment of a surveillance video playback method according to the present application.

For one implementation manner in which a user that has the permission to view the collected data requests the video data using the client device 100 and acquires the collected data corresponding to the video data at the same time, reference may be made to the schematic diagram in FIG. 6. The following manner is used for implementation.

A peripheral unit performs real-time surveillance, obtains corresponding video data, and transmits the video data to a video surveillance management device. If the peripheral unit is recording a video, the video surveillance management device stores the video data in a video file format.

A collecting device collects information in real time to obtain corresponding collected data, and transmits the collected data to the peripheral unit. The peripheral unit transmits the collected data to the video surveillance management device. If the peripheral unit is recording a video, the video surveillance management device stores the collected data separately in a metadata form to obtain a collected data file.

The video surveillance management device establishes indexes for a video file and the collected data file.

When a user sends a surveillance video browsing request to the video surveillance management device using a client device, the video surveillance management device finds the indexes of the video file and the collected data file that meet a condition of the user, and then finds the video data and the collected data and transmits the video data and the collected data to the client device.

The client device 100 performs decoding and superimposes the collected data on the video data and play the superimposed data in an OSD manner. In addition, the client device 100 may also download the video data and the collected data and store them on a local machine. When the video needs to be browsed next time, the video data and the collected data may be directly decoded and superimposed locally for playback, without a need to send a request to the video surveillance management device.

According to the description of the foregoing embodiment, it may be understood that, in the present application, permission of a client device 100 is managed, collected data and video data are sent to the client device 100 only when a user that sends a request using the client device 100 has permission to view the collected data, and the video data and the collected data are superimposed and then played only when the user selects superimposition playback. In this manner, whether to send collected data corresponding to video data to a client device 100 can be flexibly controlled according to permission of a user that sends a surveillance video browsing request, and whether to play the collected data with the video data is determined according to the user's selection, thereby making surveillance video playback more flexible, preventing a problem that a person that does not need to view the collected data has to view the collected data, minimizing user permission, and bringing higher security.

In addition, the video data and the collected are superimposed and played in an OSD manner, so that it is convenient to remove collected information when the collected information is not needed or after the collected data has been displayed for a certain period of time, and then key information in video pictures is not blocked, which brings better experience effects.

Figure 7:
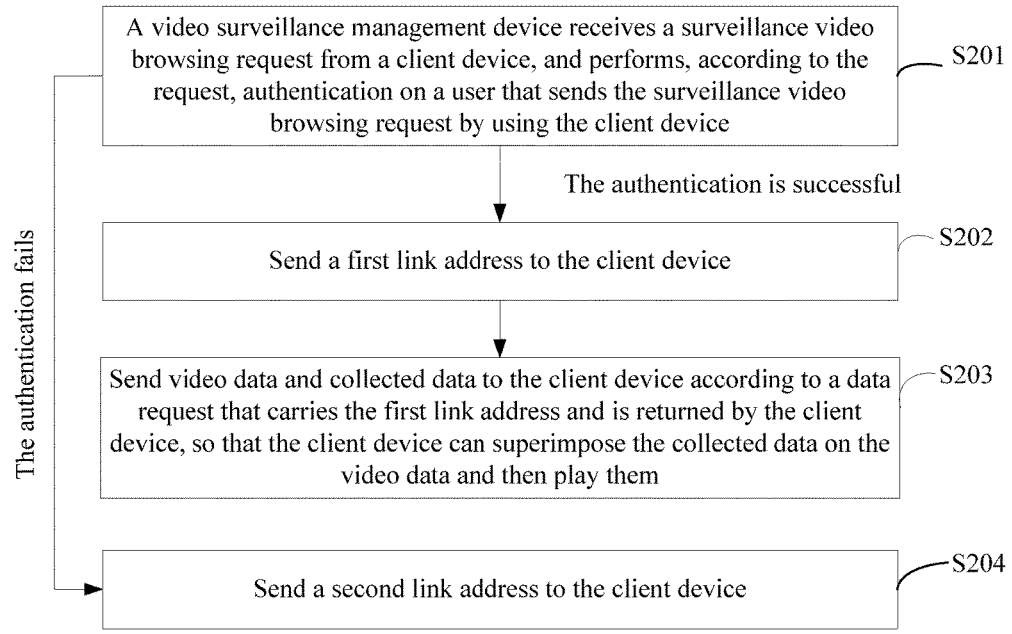
FIG. 7 is a flowchart of another embodiment of a surveillance video playback method according to the present application.

Referring to FIG. 7, FIG. 7 is a flowchart of another embodiment of a surveillance video playback method according to the present application. This embodiment is described from a perspective of the foregoing video surveillance management device. The surveillance video playback method includes the following steps.

Step S201: The video surveillance management device receives a surveillance video browsing request from a client device, and performs, according to the request, authentication on a user that sends the surveillance video browsing request using the client device.

When a user needs to view a surveillance video, a surveillance video browsing request is sent to the video surveillance management device, where the request may include condition information of the to-be-viewed video, and may also include user information such as a user account and a user identifier. The user may send a request for browsing a real-time surveillance video or may send a request for browsing a historical surveillance video.

After receiving the surveillance video browsing request, the video surveillance management device performs authentication on the user that sends the request, and determines whether the user that sends the request has permission to view collected data corresponding to requested video data. The video surveillance management device may perform authentication on the user using a preset user permission policy or in another manner, which is not limited in the present application.

When the video surveillance management device determines that the user that sends the request has the permission to view the collected data, the authentication is successful, a first link address corresponding to the video data requested by the user and to the associated collected data is generated, where the first link address is an RTSP video playback link address that carries markup of the video data and the collected data, and step S202 and a subsequent step are performed.

When the video surveillance management device determines that the user that sends the request does not have the permission to view the collected data, the authentication fails, and step S204 is performed.

Step S202: Send a first link address to the client device.

The generated first link address corresponding to the video data requested by the user and to the associated collected data is sent to the client device, so that the client device 100 can request the corresponding video data and collected data from the video surveillance management device according to the first link address.

Step S203: Send video data and collected data to the client device 100 according to a data request that carries the first link address and is returned by the client device 100, so that the client device 100 can superimpose the collected data on the video data and then play them.

If the user request is a request for browsing a historical surveillance video, the client device 100 sends the data request that carries the first link address to the video surveillance management device when the client device needs to acquire video data and collected data that are corresponding to the request. After receiving the data request, the video surveillance management device finds, according to the first link address, a video index file that meets a condition, actually finds the related video data and collected data according to a pointer address in the index file, and sends the video data and the collected data to the client device.

If the user request is a request for browsing a real-time surveillance video, when the client device 100 requests data using the first link address, the video surveillance management device acquires real-time video data and collected data from a corresponding peripheral unit according to information in the first link address, and sends the data to the client device.

In this embodiment of the present application, the peripheral unit and a collector are connected to the video surveillance management device, where the peripheral unit acquires collected data from the collector in real time, and transmits the collected data and video data that is collected by the peripheral unit to the video surveillance management device in real time.

One implementation manner in which the peripheral unit transmits the video data and the collected data to the video surveillance management device may be using the RTSP/RTP for transmission, where the collected data that is synchronous with the video data is carried in a transmission path, an extension RTP header, of the video data.

Figure 8:
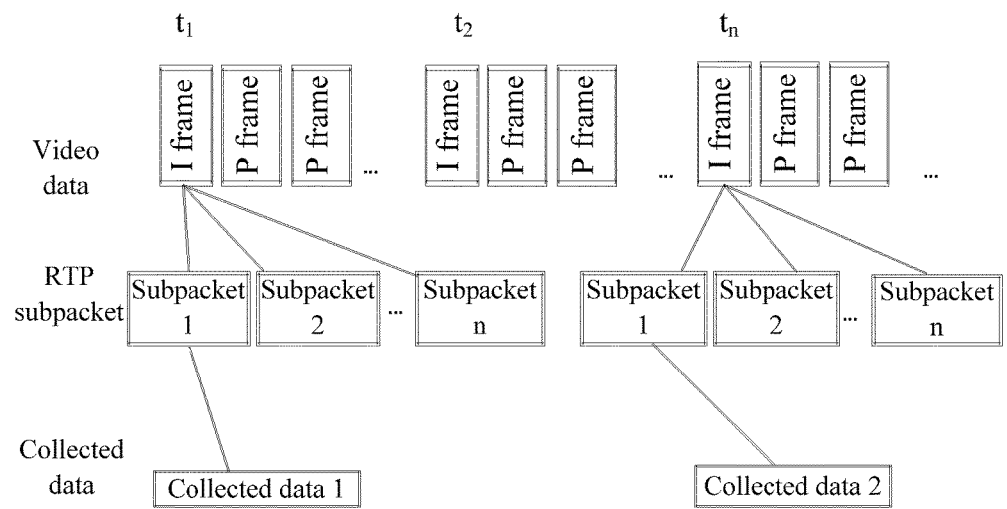
FIG. 8 is a schematic diagram of RTP packaging for transmitting collected data in one embodiment of a surveillance video playback method according to the present application.

In a carrying manner, the first I (intra-coded picture) frames of the video data and the collected data at a same moment are associated. A header of the first RTP subpacket in an I frame carries information about the collected data. For specific implementation, reference may be made to the schematic diagram shown in FIG. 8. There is a group of pictures at each of the moments $t_1, t_2, \ldots,$ and $t_n$. There is one collection period separately at the moments $t_1$ and $t_n$, and collected data at the corresponding moments is collected. During transmission through an RTP channel, collected data in a collection period $t_1$ is added to an extension field of a header of the first RTP subpacket in the first I frame at the each of the moments $t_1-t_{n-1}$ of the video data, and is sent together with the video data to the video surveillance management device.

Content of the collected data is encapsulated in binary format and using a key-value form into an extension field of an RTP header. For examples of some definitions of Keys, refer to Table 1.

TABLE 1

Examples of some definitions of Keys

| Key definition (occupying 1 byte) | Description | Value (occupying 4 bytes) |
| --- | --- | --- |
| 00000001 | Temperature | Unit: Celsius degree |
| 00000010 | Humidity | Relative humidity |
| 00000011 | Wind speed | Unit: meter per second |
| 00000100 | Wind direction | Unit: degree |
| 00000101 | Sound | Unit: decibel |
| 00000110 | Longitude | Unit: minute |
| 00000111 | Latitude | Unit: minute |
| 00001000 | Speed | Unit: meter per second |
| . . . | | |

If the peripheral unit is recording a video, all records of collected data in a video clip are stored in a collected data file in binary format, a name of the file is in a format of a sequence number of a camera for the collected data+start collection time, and an extension is cdata. For an example of a format in which a piece of collected data is stored, refer to Table 2.

TABLE 2

Example of a format in which a piece of collected data is stored

| 4-byte collection time | 1-byte key | 4-byte value | 3-byte padding character |
|---|---|---|---|

Another implementation manner in which the peripheral unit transmits the video data and the collected data to the video surveillance management device is transmitting the video data using the RTSP/RTP, and bearing, using a Transmission Control Protocol (TCP)/User Datagram Protocol (UDP) message, the collected data synchronous with the video data. Based on the TCP/UDP bearing protocol, a Session Initiation Protocol (SIP) message may be used to send the collected data to the video surveillance management device through a message interface.

For an example of a message format of a SIP message, refer to Table 3.

TABLE 3

Example of a message format of a SIP Message

| | Attribute | | Description |
|---|---|---|---|
| 1 | MESSAGE | Element | Start of information |
| 2 | Version | Attribute | Version information 1.0 |
| 3 | Seq | Attribute | Message sequence number |
| 4 | Type | Attribute | Message type: COLLECTING_DATA |
| 5 | DATA | Element | Specific collected data The collected data is encapsulated in a key-value format, then undergoes BASE64 coding to form a character string that can be displayed, and is included in CDATA. |

Figure 9:
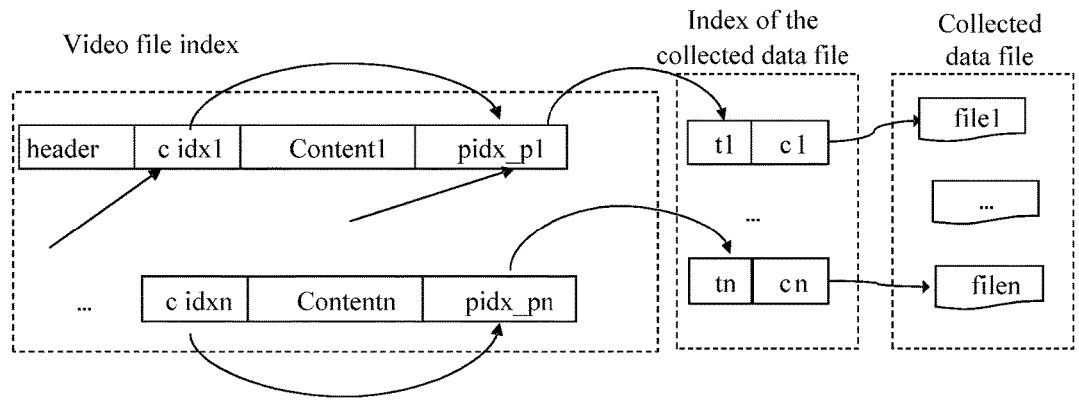
FIG. 9 is a schematic diagram of storage of collected data in one embodiment of a surveillance video playback method according to the present application.

After receiving the data sent by the peripheral unit, the video surveillance management device parses the data; if the peripheral unit is recording a video, the video surveillance management device stores the collected data and the video data separately and establishes an association between them. As shown in FIG. 9, during creation of a video file index, operations are performed according to determining of whether the collected data is included in the received data (which is determined according to whether an extension field in an RTP packet header includes the collected data). If there is the collected data, a pointer for a collected data file is established in the video file index, and an association is established between the collected data file and a video data file.

A manner of sending the video data and the collected data to the client device 100 may be using a separate message, such as TCP and UDP, or Hypertext Transfer Protocol (HTTP), SIP, and Simple Object Access Protocol (SOAP), or may be transmitting the collected data and the video data together, for example, based on an RTP extension or based on a program stream/transport stream (PS/TS) extension. A format of message content may be a binary format or an Extensible Markup Language (XML) format.

In addition, in this embodiment of the present application, during transmission and storage, data content of the collected data may be represented in XML format. The following shows an example of a definition of an XML format.

```
<xs:complexType name="Collecting_data">
<xs:complexType name="CameraInfo">
    <xs:element name="DeviceID" type="xs:int"/>
    <xs:element name="Date" type="xs:date"/>
    <xs:element name="Time" type="xs:time"/>
</xs:complexType>
        <xs:complexType name="CollectingInfo">
            <xs:element name="temperature" type="xs:float"/>
            <xs:element name="humidity" type="xs:float"/>
            <xs:element name="windSpeed" type="xs:float"/>
            <xs:element name="windDirection" type="xs:float"/>
            ...
</xs:complexType>
</xs:complexType>
```

Returning to FIG. 7, Step S204: Send a second link address to the client device.

When the user that sends the surveillance video browsing request does not have the permission to view the collected data, the video surveillance management device sends the second link address to the client device, where the second link address is an RTSP video playback link address that carries only video data; the client device 100 acquires the video data from the video surveillance management device according to the second link address and plays the video data.

The following uses a manner of interaction between a client device 100 and a video surveillance management device to describe the surveillance video playback method according to the present application.

Figure 10:
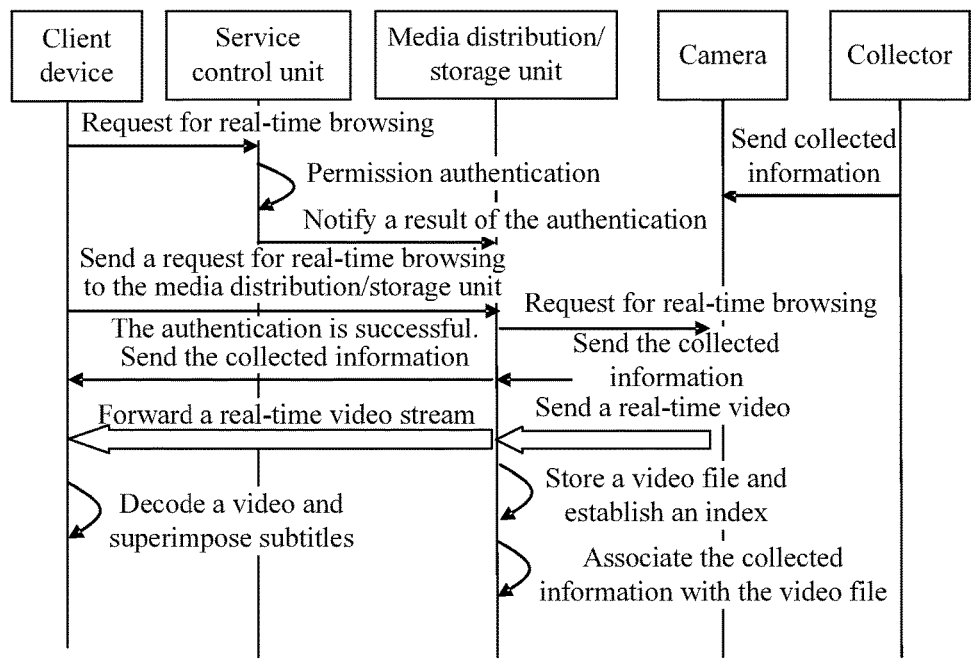
FIG. 10 is a schematic diagram of an implementation process of playing a real-time surveillance video in one embodiment of a surveillance video playback method according to the present application.

When a user needs to browse a real-time surveillance video, refer to FIG. 10. FIG. 10 is a schematic diagram of an implementation process of playing a real-time surveillance video, where the process includes the following steps.

1. A user sends, using a client device serving the user, a request for browsing a live video (that is, real-time video data and collected data) to a service control unit of a video surveillance management device.

2. The service control unit performs authentication on the request of the user, including determining whether the user has permission to view the collected data. If the authentication is successful, a first link address of a media distribution/storage unit of the video surveillance management device is generated for a corresponding service and sent to the client device, and at the same time, the media distribution/storage unit is notified of a result of the authentication; if the authentication fails, a second link address is returned to the client device. For description of the first link address and the second link address, refer to the foregoing embodiments.

3. The client device serving the user requests the live video from the media distribution/storage unit according to the first link address or the second link address.

4. The media distribution/storage unit requests the live video from a peripheral camera.

5. If the peripheral camera is connected to an external collector, the peripheral camera sends the collected data together to the media distribution/storage unit when transmitting video media data of the live video.

6. The media distribution/storage unit forwards, to the client device, video media data that carries the collected data, and if the authentication fails, forwards only the video media data to the client device.

7. The client device receives, temporarily stores, decodes, and renders the data, and determines, according to whether data superimposition is enabled or disabled, whether to perform playback in an OSD superimposition manner. For a superimposition manner, refer to description in the foregoing embodiments.

8. If the video surveillance management device needs to perform a video recording service at the same time, the media distribution/storage unit stores the video media data and the collected data and generates a video index file.

Figure 11:
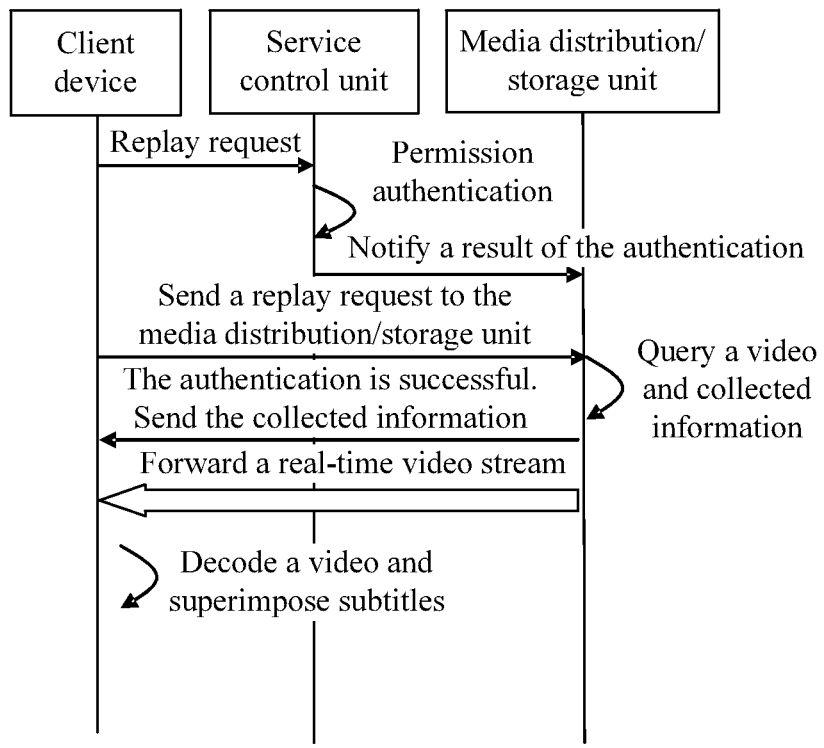
FIG. 11 is a schematic diagram of an implementation process of playing a historical surveillance video in one embodiment of a surveillance video playback method according to the present application.

When a user needs to browse a historical surveillance video, refer to FIG. 11. FIG. 11 is a schematic diagram of an implementation process of playing a historical surveillance video, where the process includes the following steps.

1. A user sends, to a service control unit of a video surveillance management device using a client device serving the user, a request for playing a video (that is, historical video data and corresponding collected data).

2. The service control unit performs authentication on the request of the user, including determining whether the user has permission to view the collected data. If the authentication is successful, a first link address of a media distribution/storage unit of the video surveillance management device is generated for a corresponding service and sent to the client device, and at the same time, the media distribution/storage unit is notified of a result of the authentication; if the authentication fails, a second link address is returned to the client device.

3. The client device serving the user requests the historical video data and the collected data from the media distribution/storage unit according to the first link address or the second link address.

4. According to the user request, the media distribution/storage unit queries a video index file, and finds the video data and the collected data according to locations specified in the index file.

5. The media distribution/storage unit packages and encapsulates the collected data and the video data and then sends the data to the client device. If the authentication fails, only the video data is sent.

6. The client device receives, temporarily stores, decodes, and renders the data, and determines, according to whether data superimposition is enabled or disabled, whether to perform playback in an OSD superimposition manner. For superimposition implementation, refer to description in the foregoing embodiments.

In this embodiment, when a user that has permission to view collected data needs to download a video that includes information about the collected data, the user may select to download the collected data with the video and store the collected data on a local machine. For an implementation process, refer to description in the foregoing embodiments. The downloaded collected data is stored in an extension field of a video file encapsulation format MP4, and is associated with video content by timestamp, as shown in FIG. 5.

When the user needs to watch the video that includes the information about the collected data on the local machine, a player on a client device parses the information about the collected data in an MP4 file, superimposes the collected data on the video in an OSD manner, and displays the video to the user.

Figure 12:
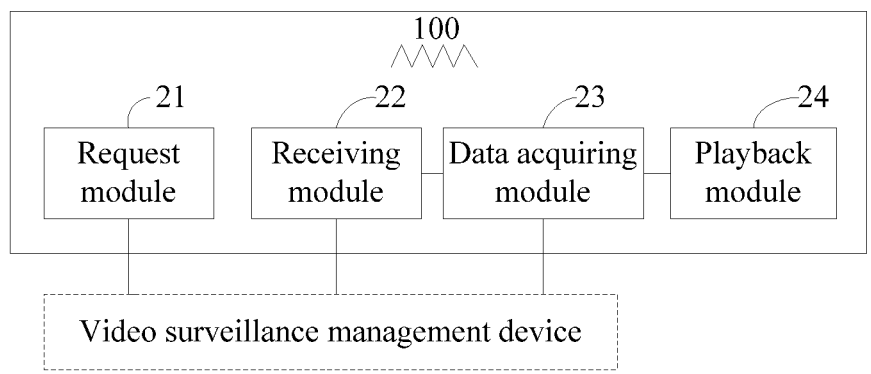
FIG. 12 is a schematic structural diagram of an embodiment of a client device according to the present application.

Referring to FIG. 12, FIG. 12 is a schematic structural diagram of an embodiment of a client device 100 according to the present application. A client device 100 includes a request module 21, a receiving module 22, a data acquiring module 23, and a playback module 24.

The request module 21 is configured to send a surveillance video browsing request to a video surveillance management device.

When a user needs to view a surveillance video, a surveillance video browsing request is sent to the video surveillance management device using the request module 21 of the client device 100 serving the user, where the request may include condition information of the to-be-viewed video, and may also include user information such as a user account and a user identifier.

The receiving module 22 is configured to, when the video surveillance management device determines, according to the surveillance video browsing request, that the user that sends the surveillance video browsing request using the client device 100 has permission to view collected data, receive a first link address returned by the video surveillance management device, and output the first link address to the data acquiring module 23, where the first link address is an RTSP video playback link address that carries markup of video data and the collected data.

When the user that sends the surveillance video browsing request has the permission to view the collected data, authentication at a video surveillance management device end is successful, and the receiving module 22 receives the first link address returned by the video surveillance management device, and outputs the first link address to the data acquiring module 23.

The data acquiring module 23 is configured to acquire the video data and the collected data from the video surveillance management device according to the first link address, and output the video data and the collected data to the playback module 24.

The data acquiring module 23 sends, according to the first link address returned by the video surveillance management device, a request for acquiring the video data and the collected data to the video surveillance management device. If the user requests a historical surveillance video, the video surveillance management device finds, according to the first link address, a video index file that meets a condition, actually finds the related video data and collected data according to a pointer address in the index file, and sends the video data and the collected data to the client device. The data acquiring module 23 of the client device 100 receives the video data and the collected data.

If the user requests a real-time surveillance video, when the client device 100 requests data using the first link address, the video surveillance management device acquires real-time video data and collected data from a corresponding peripheral unit according to information in the first link address, and sends the data to the client device.

The playback module 24 is configured to superimpose the collected data on the video data and then play them.

After receiving and temporarily storing the video data and the collected data, the client device 100 decodes the video data using the playback module 24, parses the collected data, superimposes the collected data on the video data and performs rendering, and plays the video data and the collected data in a manner of superimposing transparent subtitles on video pictures in an OSD.

Figure 13:
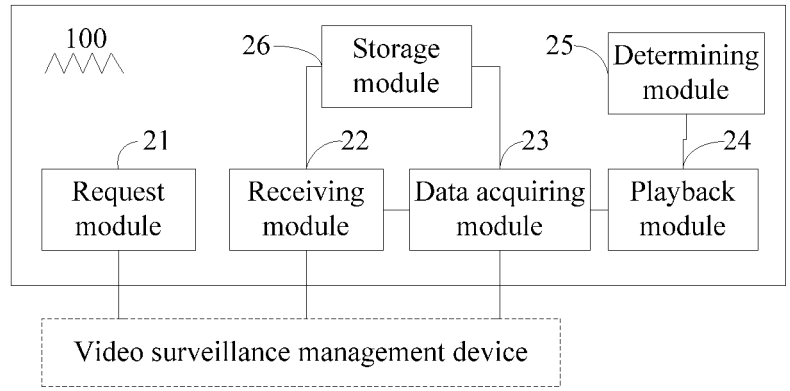
FIG. 13 is a schematic structural diagram of another embodiment of a client device according to the present application.

Referring to FIG. 13, FIG. 13 is a schematic structural diagram of another embodiment of a client device 100 according to the present application. A client device 100 includes a request module 21, a receiving module 22, a data acquiring module 23, a playback module 24, a determining module 25, and a storage module 26.

The request module 21 is configured to send a surveillance video browsing request to a video surveillance management device.

A user may use the request module 21 of the client device 100 to send a request for browsing a real-time surveillance video or send a request for browsing a historical surveillance video.

The receiving module 22 is configured to, when the video surveillance management device determines, according to the surveillance video browsing request, that a user that sends the surveillance video browsing request using the client device 100 has permission to view collected data, receive a first link address returned by the video surveillance management device, and output the first link address to the data acquiring module 23.

The receiving module 22 is further configured to, when the user that sends the surveillance video browsing request does not have the permission to view the collected data, receive a second link address returned by the video surveillance management device, where the second link address is an RTSP video playback link address that carries only video data.

The data acquiring module 23 is configured to acquire video data and the collected data from the video surveillance management device according to the first link address, and output the video data and the collected data to the playback module 24.

When the user does not have the permission to view the collected data, the data acquiring module 23 is further configured to acquire video data from the video surveillance management device according to the second link address.

The storage module 26 is configured to separately store, in different files, the video data and the collected data that are received by the data acquiring module 23 and associate the files using a same file name; or configured to extend the collected data received by the data acquiring module 23 in an extension field of the video data to store the collected data together with the video data.

The storage module 26 may download the acquired video data and collected data and store them in a file format on a local machine. Storing the downloaded data in a file format may be storing the collected data and the video data together in a same file, or may be storing the collected data, for example, in a subtitle file, separately from a video data file. The manner of storing the video data and the collected data together may be extending the collected data in an extension field of a video data file format such as MP4 and AVI, and establishing an association with the video data by timestamp (as shown in FIG. 5). The manner of separately storing the video data and the collected data may be storing the collected data independently in binary or text format, and associating the collected data with the video data file using a same file name.

The storage module 26 is further configured to, when the user that sends the request does not have the permission to view the collected data, store, on a local machine, the video data that is returned by the video surveillance management device and received by the receiving module 22.

The playback module 24 is configured to superimpose the collected data on the video data and then play them.

In a more preferable embodiment, the playback module 24 may determine, according to whether the user selects data superimposition, whether to perform OSD superimposition playback.

The determining module 25 is configured to determine whether an instruction to select data superimposition is received, and output a result of the determining to the playback module 24.

When the determining module 25 determines that the instruction to select data superimposition is received, the playback module 24 superimposes the collected data on the video data and then plays them in an OSD manner; when the determining module 25 determines that the instruction to select data superimposition is not received, the playback module 24 plays only the video data.

During playback of superimposed data, the playback module 24 finds an associated start frame in the video data according to timestamp information included in the collected data, decodes the video data for playback, and at the same time, extracts collected data corresponding to the start frame, renders and superimposes the data, and then plays the data in an OSD manner.

In a preferable manner, maximum retention time for collected data may be preset. If no new collected data is received after the maximum retention time for collected data, the playback module 24 invalidates previously displayed collected data (that is, the collected data is no longer superimposed on video pictures). If new collected data is received within the preset maximum retention time, the playback module 24 replaces original collected data with the new collected data, and superimposes the new collected data on current video data and then plays them.

If the user does not have the permission to view the collected data, the playback module 24 is configured to play the video data.

Figure 14:
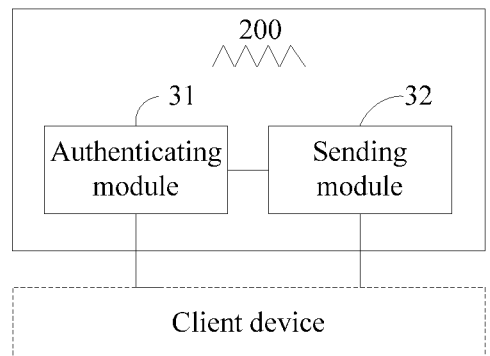
FIG. 14 is a schematic structural diagram of an embodiment of a video surveillance management device according to the present application.

Referring to FIG. 14, FIG. 14 is a schematic structural diagram of an embodiment of a video surveillance management device according to the present application. A video surveillance management device 200 includes an authenticating module 31 and a sending module 32.

The authenticating module 31 is configured to receive a surveillance video browsing request from a client device, perform, according to the request, authentication on a user that sends the surveillance video browsing request using the client device, and output a result of the authentication to the sending module 32.

When a user needs to view a surveillance video, a surveillance video browsing request is sent to the video surveillance management device 200, where the request may include condition information of the to-be-viewed video, and may also include user information such as a user account and a user identifier. The user may send a request for browsing a real-time surveillance video or may send a request for browsing a historical surveillance video.

After receiving the surveillance video browsing request, the authenticating module 31 of the video surveillance management device performs authentication on the user that sends the request, and determines whether the user that sends the request has permission to view collected data corresponding to requested video data. The authenticating module 31 may perform authentication on the user using a preset user permission policy or in another manner, which is not limited in the present application.

When the authenticating module 31 determines that the user that sends the request has the permission to view the collected data, the authentication is successful, and a first link address corresponding to the video data requested by the user and to the associated collected data is generated and output to the sending module 32. If the authenticating module 31 determines that the user that sends the request does not have the permission to view the collected data, a second link address corresponding to the user request is generated and output to the sending module 32, so that the sending module 32 sends the second link address to the client device.

The sending module 32 is configured to, when the authenticating module 31 learns, by means of the authentication, that the user that sends the surveillance video browsing request has the permission to view the collected data, send the first link address to the client device, and send the video data and the collected data to the client device 100 according to a data request that carries the first link address and is returned by the client device 100, so that the client device 100 can superimpose the collected data on the video data and then play them.

When the authentication performed by the authenticating module 31 is successful, the sending module 32 sends, to the client device, the generated first link address corresponding to the video data requested by the user and to the associated collected data, so that the client device 100 can request the corresponding video data and collected data from the video surveillance management device according to the first link address.

When the client device 100 sends the data request that carries the first link address, if the user requests browsing of a historical surveillance video, the sending module 32 finds, according to the first link address, a video index file that meets a condition, actually finds the related video data and collected data according to a pointer address in the index file, and sends the video data and the collected data to the client device.

If the user requests browsing of a real-time surveillance video, when the client device 100 requests data using the first link address, the sending module 32 acquires real-time video data and collected data from a corresponding peripheral unit according to information in the first link address, and sends the data to the client device.

A manner of sending the video data and the collected data to the client device 100 by the sending module 32 may be using a separate message, such as TCP and UDP, or HTTP, SIP, and SOAP, or may be transmitting the collected data and the video data together, for example, based on an RTP extension or based on a PS/TS extension. A format of message content may be a binary format or an XML format.

Figure 15:
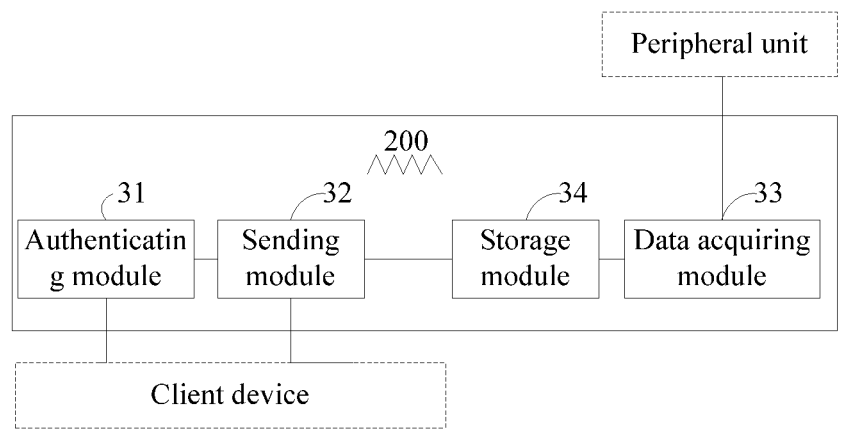
FIG. 15 is a schematic structural diagram of another embodiment of a video surveillance management device according to the present application.

Further referring to FIG. 15, FIG. 15 is a schematic structural diagram of another embodiment of a video surveillance management device according to the present application. The video surveillance management device 200 includes an authenticating module 31, a sending module 32, a data acquiring module 33, and a storage module 34.

The authenticating module 31 is configured to receive a surveillance video browsing request from a client device, perform, according to the request, authentication on a user that sends the surveillance video browsing request using the client device, and output a result of the authentication to the sending module 32.

The sending module 32 is configured to, when the authenticating module learns, by means of the authentication, that the user that sends the surveillance video browsing request has permission to view collected data, send a first link address to the client device, and send video data and the collected data to the client device 100 according to a data request that carries the first link address and is returned by the client device 100, so that the client device 100 can superimpose the collected data on the video data and then play them.

In this embodiment of the present application, the video surveillance management device 200 is connected to a peripheral unit and a collector, where the peripheral unit acquires collected data from the collector in real time, and transmits the collected data and video data that is collected by the peripheral unit to the video surveillance management device 200 in real time.

The video surveillance management device 200 receives, using the data acquiring module 33, the video data and the collected data that are transmitted by the peripheral unit.

The data acquiring module 33 receives the video data and the collected data that are transmitted by the peripheral unit using the RTSP/RTP.

When the peripheral unit is recording a video, the storage module 34 separately stores, in different files, the video data and the collected data that are received by the data acquiring module 33, and generates a video data index and adds an index pointer for the collected data at the same time according to a time association between the collected data and the video data; or extends the collected data received by the data acquiring module 33 in an extension field of the video data to store the collected data together with the video data.

After receiving the data sent by the peripheral unit, the data acquiring module 33 parses the data and outputs data to the storage module 34. If the peripheral unit is recording a video, the storage module 34 stores the collected data and the video data separately and establishes an association between them (as shown in FIG. 9). If the video data and the collected data are combined and transmitted together, during creation of a video file index, operations are performed according to determining of whether the collected data is included in the received data (which is determined according to whether an extension field in an RTP packet header includes the collected data). If there is the collected data, a pointer for a collected data file is established in the video file index, and an association is established between the collected data file and a video data file.

For the video surveillance management device in the foregoing embodiment, its module division is another division different from that of functional units in the embodiment shown in FIG. 1, and implemented functions are the same as those implemented by the video surveillance management device in the embodiment shown in FIG. 1.

Figure 16:
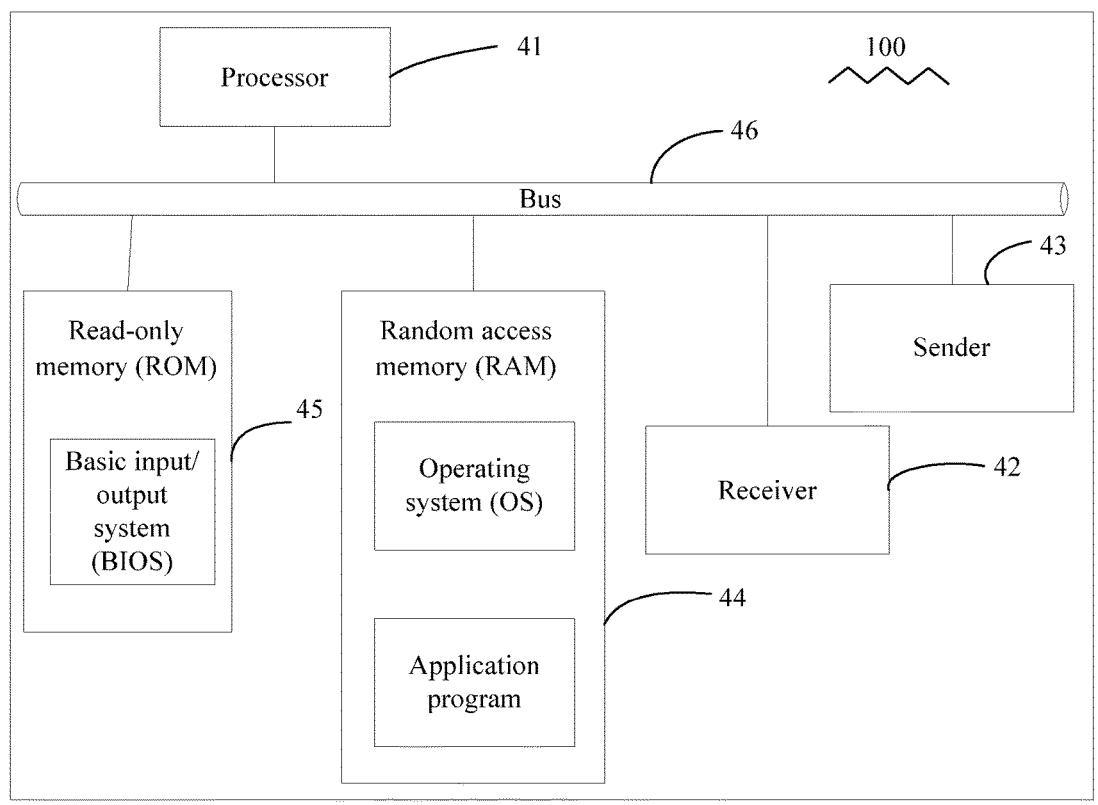
FIG. 16 is a schematic structural diagram of still another embodiment of a client device according to the present application.

Referring to FIG. 16, FIG. 16 is a schematic structural diagram of still another embodiment of a client device 100 according to the present application. A client device 100 includes a processor 41, a receiver 42, a sender 43, a random access memory 44, a read-only memory 45, and a bus 46. The processor 41 is separately coupled to the receiver 42, the sender 43, the random access memory 44, and the read-only memory 45 using the bus 46. When a policy management device needs to be run, a bootloader in a basic input/output system or an embedded system is used to boot a system and boot the client device 100 into a proper running state, where the basic input/output system or the embedded system is fixed in the read-only memory 45. After entering the proper running state, the client device 100 runs an application program and an operating system in the random access memory 44, and enables the following implementation.

The sender 43 sends a surveillance video browsing request to a video surveillance management device, where the request may be a request for browsing a real-time surveillance video or may be a request for browsing a historical surveillance video.

The video surveillance management device performs authentication on a user that sends the request; when the user that sends the request has permission to view collected data, the receiver 42 receives a first link address returned by the video surveillance management device, where the first link address is an RTSP video playback link address that carries markup of video data and the collected data; the sender 43 sends a data request to the video surveillance management device according to the first link address; the receiver 42 further receives video data and collected data that are returned by the video surveillance management device and that meet a user request condition. If the user that sends the request does not have the permission to view the collected data, the receiver 42 receives a second link address returned by the video surveillance management device, where the second link address is an RTSP video playback link address that carries only video data; the sender 43 sends a data request to the video surveillance management device according to the second link address; the receiver 42 further receives video data that is returned by the video surveillance management device and that meets a user request condition.

The processor 41 is configured to superimpose the collected data on the video data and then play them in an OSD manner. For a user that has the permission to view the collected data, the processor 41 may determine, according to whether the user selects an instruction to superimpose data, whether to superimpose data for playback. This may prevent a problem that a user that has the permission to view the collected data but does not need to view the collected data has to view superimposed collected data, minimize user permission, and bring higher security.

Further, when the user that sends the request does not have the permission to view the collected data, the processor 41 plays only the video data returned by the video surveillance management device.

In this embodiment, the processor 41 may be a central processing unit (CPU), or an application-specific integrated circuit (ASIC), or is configured as one or more integrated circuits that implement this embodiment of the present application.

Figure 17:
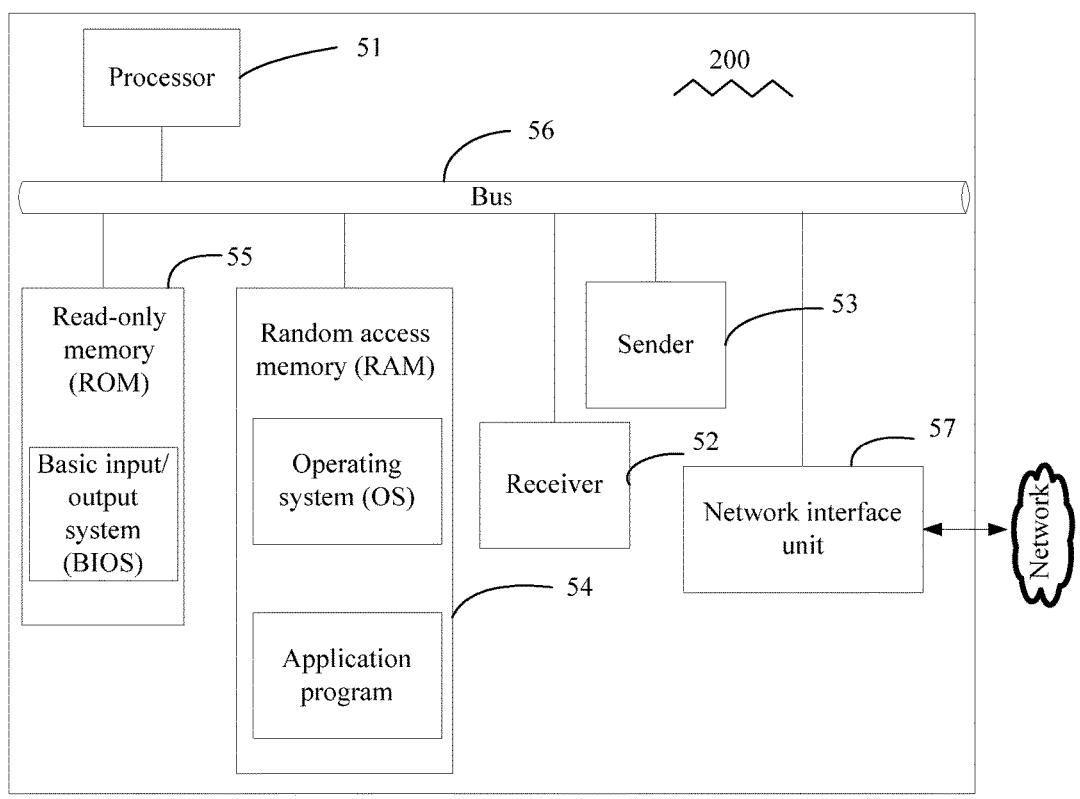
FIG. 17 is a schematic structural diagram of still another embodiment of a video surveillance management device according to the present application.

Referring to FIG. 17, FIG. 17 is a schematic structural diagram of another embodiment of a video surveillance management device according to the present application. A video surveillance management device 200 includes a processor 51, a receiver 52, a sender 53, a random access memory 54, a read-only memory 55, a bus 56, and a network interface unit 57. The processor 51 is separately coupled to the receiver 52, the sender 53, the random access memory 54, the read-only memory 55, and the network interface unit 57 using the bus 56. When a network traffic processing device needs to be run, a bootloader in a basic input/output system or an embedded system is used to boot a system and boot the network traffic processing device into a proper running state, where the basic input/output system or the embedded system is fixed in the read-only memory 55. After entering the proper running state, the network traffic processing device runs an application program and an operating system in the random access memory 54, receives data from a network or sends data to a network, and enables the following implementation:

The receiver 52 receives a surveillance video browsing request from a client device.

The processor 51 performs, according to its permission management policy or in another manner, authentication on a user that sends the request. When the user that sends the request has permission to view collected data, the processor 51 generates a first link address corresponding to video data requested by the user and to associated collected data, and sends the first link address to the client device 100 using the sender 53, where the first link address is an RTSP video playback link address that carries markup of the video data and the collected data.

When the client device 100 sends a data request that carries the first link address, if the user requests browsing of a historical surveillance video, the video data and the collected data are found according to the first link address, and the video data and the collected data are sent to the client device 100 using the sender 53.

If the user requests browsing of a real-time surveillance video, when the client device 100 requests data using the first link address, real-time video data and collected data from a corresponding peripheral unit are acquired according to information in the first link address, and the video data and the collected data are sent to the client device 100 using the sender 53.

When learning, by means of the authentication, that the user that sends the request does not have the permission to view the collected data, the processor 51 generates a second link address corresponding to video data that meets a user request condition, and sends the second link address to the client device 100 using the sender 53, where the second link address is an RTSP video playback link address that carries only video data.

When the client device 100 sends a data request that carries the second link address, the video data is acquired according to the second link address, and the video data is sent to the client device 100 using the sender 53.

In this embodiment, the processor 51 may be a CPU, or an ASIC, or is configured as one or more integrated circuits that implement this embodiment of the present application.

According to the provided client device and video surveillance management device, the present application further provides a video surveillance system including a client device 100 and a video surveillance management device 200. Communication is implemented between the client device 100 and the video surveillance management device 200. For specific information, refer to FIG. 1 and related description. For function implementation of the client device 100 and the video surveillance management device 200, refer to corresponding description of the embodiments shown in FIG. 12 to FIG. 17, and details are not repeatedly described herein.

According to the foregoing technical solutions, permission of a client device is managed, collected data and video data are sent to the client device only when a user that sends a request using the client device has permission to view the collected data, and the video data and the collected data are superimposed and then played only when the user selects superimposition playback. In this manner, whether to send collected data corresponding to video data to a client device can be flexibly controlled according to permission of a user that sends a surveillance video browsing request, and whether to play the collected data with the video data is determined according to the user's selection, thereby making surveillance video playback more flexible, preventing a problem that a person that does not need to view the collected data has to view the collected data, minimizing user permission, and bringing higher security.

In addition, the video data and the collected are superimposed and played in an OSD manner, so that it is convenient to remove collected information when the collected information is not needed or after the collected data has been displayed for a certain period of time, and then key information in video pictures is not blocked, which brings better experience effects.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely embodiments of the present application, and are not intended to limit the scope of the present application. An equivalent structural or equivalent process alternation made using the content of the specification and drawings of the present application, or an application of the content of the specification and drawings directly or indirectly to another related technical field, shall fall within the protection scope of the present application.

What is claimed is:

1. A surveillance video playback method, comprising:
   receiving, by a video surveillance management device, a surveillance video browsing request from a client device;
   determining, by the video surveillance management device, that a user of the client device has permission to view collected data according to user information, wherein the collected data comprises information about an environment around a peripheral unit which captures video data;
   sending, by the video surveillance management device, a first link address corresponding to the surveillance video browsing request to the client device wherein the first link address is a Real-Time Streaming Protocol video playback link address that carries markup of the video data and the collected data; and
   sending, by the video surveillance management device, the video data and the collected data to the client device in response to a data request that carries the first link address received from the client device, wherein the collected data is carried in a Real-Time Streaming Protocol/Real-Time Transport Protocol (RTP) header of the video data.

2. The method according to claim 1, wherein before sending the video data and the collected data to the client device, the method further comprises receiving, by the video surveillance management device, the video data and the collected data that are transmitted by the peripheral unit.

3. The method according to claim 2, wherein receiving, by the video surveillance management device, the video data and the collected data that are transmitted by the peripheral unit comprises receiving, by the video surveillance management device, the video data that is transmitted by the peripheral unit using a RTP, and wherein the collected data is carried in the RTP header of the video data.

4. The method according to claim 3, wherein, the RTP header is a header of a RTP packet of an I frame in video data that is at a same moment with the collected data.

5. The method according to claim 2, further comprising:
   separately storing, by the video surveillance management device, the video data and the collected data in different files;
   generating a video data index; and
   adding an index pointer for the collected data at a same time according to a time association between the collected data and the video data after receiving, by the video surveillance management device, the video data and the collected data that are transmitted by the peripheral unit when the peripheral unit is recording a video.

6. The method according to claim 2, further comprising extending the collected data in an extension field of the video data to store the collected data together with the video data after receiving, by the video surveillance management device, the video data and the collected data that are transmitted by the peripheral unit when the peripheral unit is recording a video.

7. The method according to claim 1, wherein sending, by the video surveillance management device, the video data and the collected data to the client device comprises separately transmitting, according to the first link address, the video data and the collected data to the client device.

8. The method according to claim 1, wherein sending, by the video surveillance management device, the video data and the collected data to the client device comprises combining the video data and the collected data and then sending the video data and the collected data together to the client device.

9. The method according to claim 1, wherein after receiving, by the video surveillance management device, the surveillance video browsing request from the client device, the method further comprises:
   determining, by the video surveillance management device, the user of the client device that sends the surveillance video browsing request does not have permission to view the collected data,
   sending, by the video surveillance management device, a second link address to the client device when the user of the client device that sends the surveillance video browsing request does not have permission to view the collected data, wherein the second link address is a Real-Time Streaming Protocol video playback link address that carries only video data.

10. A client device comprising:
   a non-transitory computer readable medium which contains computer-executable instructions;
   a transmitter configured to send a surveillance video browsing request to a video surveillance management device;
   a receiver configured to receive a first link address returned by the video surveillance management device when the video surveillance management device determines, according to the surveillance video browsing request, that a user of the client device that sends the surveillance video browsing request has permission to view collected data, wherein the collected data comprises information about an environment around a peripheral unit which captures video data, and wherein the first link address is a Real-Time Streaming Protocol video playback link address that carries markup of the video data and the collected data; and a processor coupled to the computer readable medium, the transmitter, and the receiver, wherein the processor is configured to execute the computer-executable instructions to:

acquire the video data and the collected data from the video surveillance management device according to the first link address, wherein the collected data is carried in a Real-Time Streaming Protocol/Real-Time Transport Protocol (RTP) header of the video data; and superimpose the collected data on the video data and then play the collected data and the video data.

11. The client device according to claim 10, wherein the processor is further configured to:

determine whether an instruction to select data superimposition is received;

superimpose the collected data on the video data and then play the collected data and the video data when determining that the instruction to select data superimposition is received; and play the video data when determining that the instruction to select data superimposition is not received.

12. The client device according to claim 10, wherein the receiver is further configured to receive a second link address returned by the video surveillance management device when the video surveillance management device determines, according to the surveillance video browsing request, that the user of the client device that sends the surveillance video browsing request does not have permission to view the collected data, wherein the second link address is a Real-Time Streaming Protocol video playback link address that carries only video data, and wherein the processor is further configured to:

acquire the video data from the video surveillance management device according to the second link address; and play the video data.

13. A video surveillance management device comprising:
a non-transitory computer readable medium which contains computer-executable instructions;
a transmitter; and
a processor coupled to the computer readable medium and the transmitter, wherein the processor is configured to:
determine that a user of a client device has permission to view collected data according to user information, wherein the collected data comprises information about an environment around a peripheral unit which captures video data; and
send, through the transmitter, a first link address to the client device, wherein the first link address is a Real-Time Streaming Protocol video playback link address that carries markup of the video data and the collected data; and
send, through the transmitter, the video data and the collected data to the client device according to a data request that carries the first link address sent by the client device, wherein the collected data is carried in a Real-Time Streaming Protocol/Real-Time Transport Protocol (RTP) header of the video data.

14. The device according to claim 13, further comprising a receiver configured to receive the video data and the collected data that are transmitted by the peripheral unit.

15. The device according to claim 14, wherein the processor is further configured to execute the computer-executable instructions to at least one of:

separately store, in different files, the video data and the collected data, generate a video data index, and add an index pointer for the collected data at a same time according to a time association between the collected data and the video data; and store the collected data.

16. The device according to claim 14, wherein, the video data that is transmitted by the peripheral unit is encapsulated using a RTP.

17. The device according to claim 16, wherein, the RTP header is a header of a RTP packet of an I frame in video data that is at a same moment with the collected data.

18. A video surveillance system comprising:
a video surveillance management device; and
a client device configured to:
send a surveillance video browsing request to the video surveillance management device;
receive a first link address returned by the video surveillance management device, when the video surveillance management device determines, according to the surveillance video browsing request, that a user of the client device that sends the surveillance video browsing request has permission to view collected data, wherein the collected data comprises information about an environment around a peripheral unit which captures video data, wherein the first link address is a Real-Time Streaming Protocol video playback link address that carries markup of the video data and the collected data;
acquire the video data and the collected data from the video surveillance management device according to the first link address, wherein the collected data is carried in a Real-Time Streaming Protocol/Real-Time Transport Protocol (RTP) header of the video data; and
superimpose the collected data on the video data and then play the collected data and the video data, wherein the video surveillance management device is configured to:
receive the surveillance video browsing request from the client device;
determine that the user of the client device has permission to view collected data according to user information, wherein the collected data comprises information about an environment around a peripheral unit which captures video data;
send the first link address to the client device, wherein the collected data comprises information about an environment around a peripheral unit which captures video data; and
send the video data and the collected data to the client device according to a data request that carries the first link address and is returned by the client device, wherein the collected data is carried in a RTP header of the video data.

19. The system according to claim 18, wherein the client device is further configured to:
determine whether an instruction to select data superimposition is received;

superimpose the collected data on the video data and then play the collected data and the video data when determining that the instruction to select data superimposition is received; and play the video data when determining that the instruction to select data superimposition is not received.

20. The system according to claim 18, wherein the client device is further configured to:

receive a second link address returned by the video surveillance management device when the video surveillance management device determines, according to the surveillance video browsing request, that the user of the client device that sends the surveillance video browsing request does not have the permission to view the collected data, wherein the second link address is a Real-Time Streaming Protocol video playback link address that carries only video data;

acquire the video data from the video surveillance management device according to the second link address; and play the video data.

21. The system according to claim 18, wherein the video surveillance management device is further configured to receive the video data and the collected data that are transmitted by the peripheral unit.

22. The system according to claim 21, wherein the video surveillance management device is further configured to:

separately store, in different files, the video data and the collected data; and generate a video data index and add an index pointer for the collected data at a same time according to a time association between the collected data and the video data.

23. The system according to claim 21, wherein the video surveillance management device is further configured to store the collected data.

* * * * *

UNITED STATES PATENT AND TRADEMARK OFFICE
CERTIFICATE OF CORRECTION

PATENT NO. : 9,843,775 B2  
APPLICATION NO. : 14/880515  
DATED : December 12, 2017  
INVENTOR(S) : Feng Wang and Liyan Song Page 1 of 1

It is certified that error appears in the above-identified patent and that said Letters Patent is hereby corrected as shown below:

On the Title Page

Under Item (56):  
Foreign Patent Documents add:  
CN 200820170406 Y 10/2009

Under Other Publications:  
Page 2, Column 2, Line 12 should read:  
Partial English Translation and Abstract of Chine Patent Application No. CN1786422, Dec. 8, 2016, 12 pages.

Page 2, Column 2, Line 14 should read:  
Partial English Translation and Abstract of Chine Patent Application No. CN101035268, Dec. 8, 2016, 8 pages.

Signed and Sealed this  
Third Day of July, 2018

Andrei Iancu  
*Director of the United States Patent and Trademark Office*